United States Patent
Agapiou

(10) Patent No.: US 7,465,133 B2
(45) Date of Patent: Dec. 16, 2008

(54) TOOLHOLDER WITH RETRACTABLE BUSHING

(75) Inventor: John S. Agapiou, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 301 days.

(21) Appl. No.: 11/401,178

(22) Filed: Apr. 10, 2006

(65) Prior Publication Data

US 2007/0237597 A1    Oct. 11, 2007

(51) Int. Cl.
B23C 1/00    (2006.01)
(52) U.S. Cl. .................................. 409/231; 409/234
(58) Field of Classification Search .............. 409/231, 409/232, 234; 279/143; 408/97
See application file for complete search history.

(56) References Cited

U.S. PATENT DOCUMENTS

| | | | | |
|---|---|---|---|---|
| 3,967,830 A | * | 7/1976 | Smith | 279/16 |
| 4,209,069 A | * | 6/1980 | Smith | 408/67 |
| 5,649,793 A | * | 7/1997 | Ericksen et al. | 408/81 |
| 5,743,683 A | * | 4/1998 | Skaggs | 408/97 |
| 5,771,762 A | * | 6/1998 | Bissett | 409/232 |
| 5,779,402 A | * | 7/1998 | Kameda | 409/136 |
| 5,947,654 A | * | 9/1999 | Blankenship et al. | 408/97 |
| 5,961,257 A | * | 10/1999 | Bettini et al. | 408/97 |
| 7,073,989 B2 | * | 7/2006 | Erickson et al. | 408/97 |
| 7,112,019 B2 | * | 9/2006 | Ammann | 409/231 |
| 7,128,506 B2 | * | 10/2006 | Ferrari et al. | 409/231 |
| 7,137,763 B2 | * | 11/2006 | Lawson | 409/231 |
| 2004/0191017 A1 | * | 9/2004 | Erickson et al. | 408/97 |

* cited by examiner

Primary Examiner—Dana Ross

(57) ABSTRACT

An apparatus and method for machining a workpiece in a single-pass comprising a tool configured to produce a borehole when rotated and translated relative to the workpiece, a toolholder configured to fixedly secure and rotate the tool, and a bushing retractably coupled to the toolholder, so as to be shiftable between extended and fully retracted positions, and preferably biased towards the extended position, wherein said tool, toolholder, and bushing are cooperatively configured such that the bushing provides lateral support for the tool during the machining process.

19 Claims, 4 Drawing Sheets

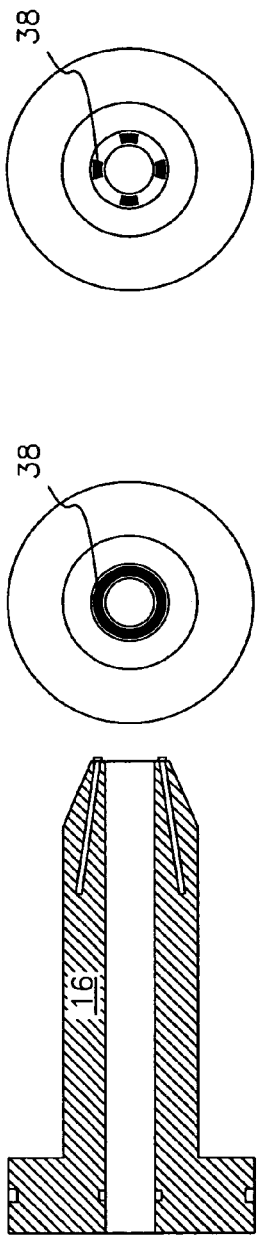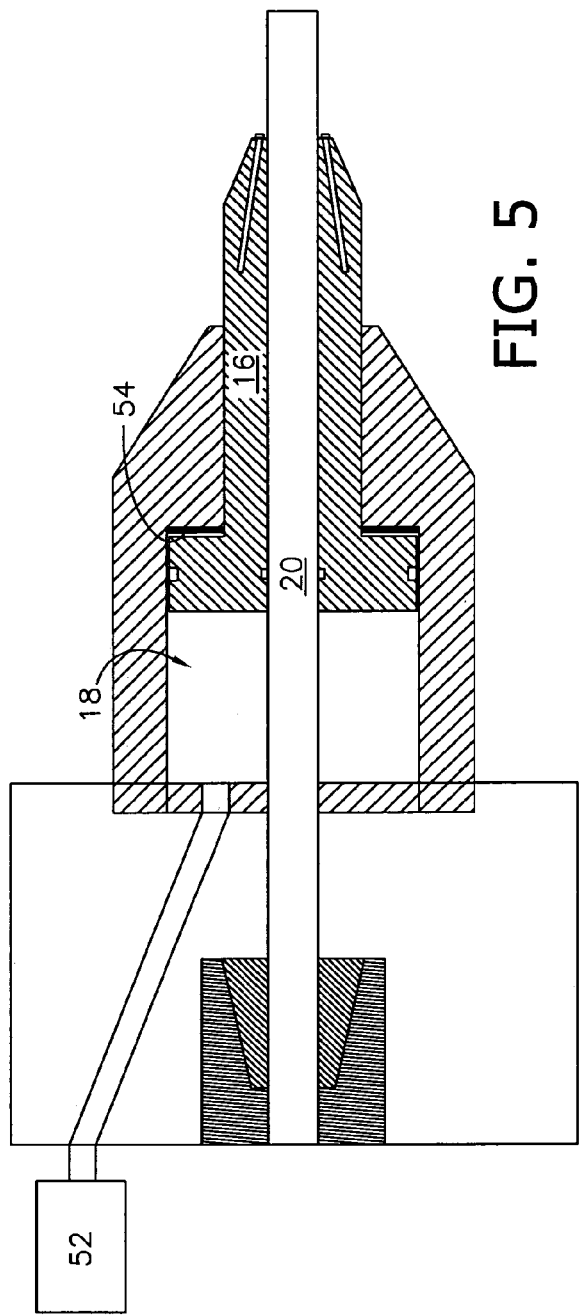

TOOLHOLDER WITH RETRACTABLE BUSHING

BACKGROUND OF THE INVENTION

1. Technical Field

The present invention relates to apparatuses, systems, and methods for reaming or otherwise producing a borehole within a workpiece, and more particularly, to an apparatus for producing a finished borehole in a single pass, wherein said apparatus includes a cutting tool, and a compressible element configured to laterally support the tool and engage the workpiece, during the boring process.

2. Background Art

In the automotive industry, methods of manufacturing cylinder heads play important roles in determining the overall cost of producing an internal combustion engine. The heads perform the important primary function of providing passageways for sufficient fuel and air to enter into a plurality of combustion chambers cooperatively defined by the heads, pistons, and cylinders of the engine. As such, each head typically presents an integrated body that defines a plurality of passageways (or boreholes). Each passageway is specifically configured to house a valve stem, so as to cyclically control the ingress and egress of fuel, air and exhaust. More particularly, these passageways include valve-guides and valve seats, wherein the oscillating valve stems are caused to translate.

Conventional processes have been developed for efficiently producing finished valve guides, and meeting the tolerances necessary to achieve desired performance. On a mass scale, these processes typically include automated three-dimensional work cells and robotic operation for manipulating rough dies (or workpieces) produced from raw material, such as aluminum or steel. Automated sub-routines are provided for performing various cutting and boring functions necessary to produce the finished valve guide boreholes in the workpiece within specified controls (e.g., 60.010 mm, perfect straightness, and maximum runout of 0.080 mm to the seat, etc.). These sub-routines typically employ a Computer Numerical Control (CNC) machine to provide a precision cutting, programmable and flexible machining process. The CNC machine is typically used in conjunction with standard reamer tools to finish the valve guides, which are typically pre-formed by a powder metallurgy process and pressed into the workpiece.

The sub-routines and processes used for machining the finished valve guides, however, present various cost inefficiencies and concerns. In order to produce a production quality hole, a plurality of passes, including a first pass wherein a smaller diameter tool is used to create a pilot (or starter) bore through a fraction of the workpiece depth, and a second finishing pass wherein the finishing tool is used to produce the final bore through the full workpiece depth, must be utilized to avoid unacceptable eccentricities caused by lateral tool deflection. Though, the pilot bore minimizes deflection during the finishing application, its implementation adds to the overall production time, and labor/energy costs. The addition of a second tool and accompanying redundant mechanisms result in a reduction of available workspace, a more complex process, and the need for greater repair and inventory capacity.

Conventional squirt-reamer single-pass processes have been developed to address these concerns. More particularly, these conventional single-pass systems are typically used with transfer line equipment or equipment dedicated to a single or limited number of uses, and incorporate a dedicated fourth axis concentrically aligned with the spindle to pilot the tool through a bushing. The bushing is fixedly secured relative to the spindle and tool holder. In operation, the bushing is positioned against the workpiece at the entrance of the bore, so as to laterally support the tool as it translates. It is appreciated that providing lateral support during the boring process controls tool straightness, reduces the eccentricity of the borehole, and limits runout relative to the valve-seat.

Squirt-reaming systems, however, present configuration and efficiency concerns that make them incompatible with CNC machining processes, and therefore unsuitable for mass-producing machined boreholes in typical cylinder head environments. First, squirt-reaming systems cannot be used with CNC machines due to a lack of flexibility with the tool change system. Conventional CNC machines are not configured to perform the necessary tool translations relative to the machining apparatus, and as such, would require substantial modifications to perform in this manner. Finally, it is also appreciated that incorporating the complex mechanical designs of conventional squirt reaming systems in a CNC machining process would result in higher susceptibility to failures, more maintenance for the station, and lower productivity.

Thus, there is a need in the art for a single-pass finished bore machining system that is suitable for mass producing ported cylinder heads.

SUMMARY OF THE INVENTION

Responsive to these and other concerns caused by conventional machining processes, the present invention concerns an apparatus and method of manufacturing/machining a finished hole in a single pass. The inventive process is useful, among other things, for producing a production quality hole in a single pass, and thereby, eliminating costs associated with multiple passes. The invention presents a novel configuration adaptable for use with most CNC and other reaming/milling machines, thereby increasing its market penetration, and applicable uses.

A first aspect of the present invention concerns an apparatus for machining a finished borehole in a workpiece, in a single pass. The apparatus includes a tool configured to mill or ream the workpiece, when in contact therewith and while rotating and translating relative thereto, so as to produce the finished borehole in the workpiece. The apparatus further includes a toolholder configured to rotate the tool and secure the tool in a fixed position relative to the tool holder, so as to present a distal tool end. Finally, the apparatus includes a first bushing that is retractably coupled to the tool holder, and presents a support section laterally adjacent at least a portion of the tool, during machining. The tool and bushing are cooperatively configured so that the bushing contacts the workpiece and slidably engages the tool during at least a portion of the tool translation period.

A second aspect of the present invention concerns a method of machining a finished borehole in a workpiece in a single pass. The method includes the steps of rotating and translating a tool relative to the workpiece, wherein said tool defines a distal end, presents a cutting surface adjacent the distal end, and engages the workpiece with the cutting surface, so as to shave material from the workpiece. The method further includes the steps of laterally supporting the tool at or near the workpiece with a collapsible element, and concurrently collapsing the element, and supporting the tool at or near the workpiece, so as to enable the further translation of the tool. Further disclosure is made as to preferred and exemplary embodiments of the invention. These and other features of the present invention are discussed in greater detail in the section below entitled DESCRIPTION OF THE PREFERED EMBODIMENT(S).

BRIEF DESCRIPTION OF THE DRAWINGS

Preferred embodiments of the invention are described in detail below with reference to the attached drawing figures, wherein:

FIG. 4a is an enlarged view of a singular carbide pad, in accordance with a preferred embodiment of the present invention;

FIG. 4b is an enlarged view of a plurality of pads, in accordance with a preferred embodiment of the present invention, and as shown in FIGS. 1 through 3;

FIG. 5 is an elevation and partially cross-sectional view of the workpiece, and apparatus, in accordance with a second preferred embodiment of the present invention, wherein said bushing is biased towards the extended position by pneumatic means;

DETAILED DESCRIPTION OF THE PREFERRED EMBODIMENT(S)

Figure 1:
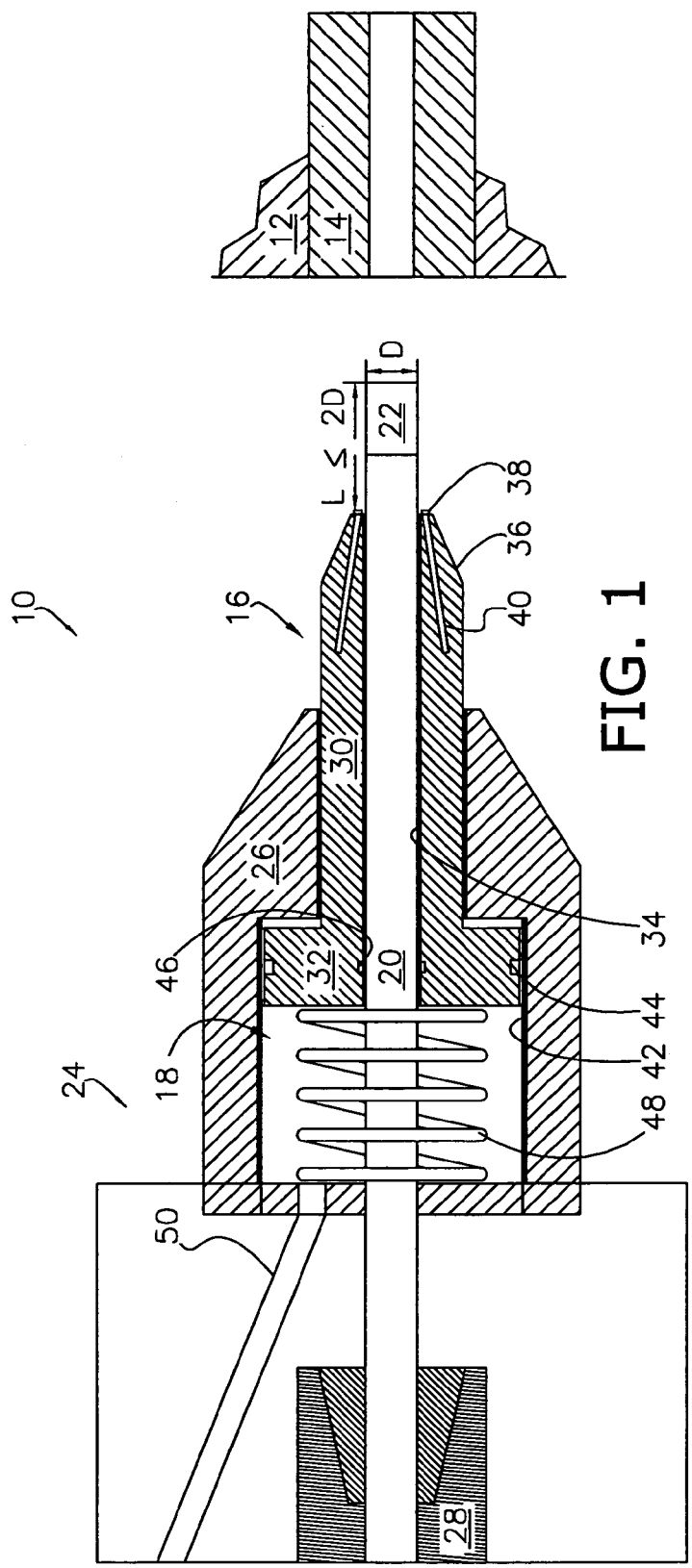
FIG. 1 is an elevation and partially cross-sectional view of the workpiece, and apparatus, comprising a tool, bushing, and toolholder, in accordance with a preferred embodiment of the present invention, wherein the bushing is in the extended position, biased towards the extended position by a spring, and the tool and bushing are disengaged from the workpiece.

As illustrated and described herein, the present invention relates to an apparatus 10 for and method of manufacturing/machining a finished borehole in a workpiece 12, in a single pass. In the automotive industry, for example, valve-guides and seats are typically produced as part of the porting process, wherein the passageways of the engine cylinder heads are created. In this process, production of the boreholes of valve-guides involves a multi-step process, wherein a separately produced valve guide 14 is integrated with the cylinder head 12, initially pilot bored, and then enlarged and finished to specifications (see, FIGS. 1 through 3).

The present invention presents a single-pass method of performing the pilot and finishing steps. As previously mentioned, it is appreciated by those ordinarily skilled in the art that the inventive apparatus 10 improves upon conventional methods and systems by eliminating the need for a second-pass during the boring process, thereby reducing the costs associated therewith. Though described and illustrated herein with respect to the automotive manufacturing process, it is also appreciated that the apparatus 10 and method of the present invention may be utilized in any machining process where it is desirous to combine multi-passes into a single-pass to produce a finished borehole.

The apparatus 10 accomplishes this task by providing a novel mechanism for laterally supporting the cutting tool during the boring process. It is appreciated that the provision of lateral support at or near the borehole entrance, results in reduced tool deflection and borehole eccentricities. More particularly, the mechanism includes a retractable bushing 16, and biasing means 18, such as a spring or pneumatic pump, that is further described herein and illustrated in FIGS. 1 through 4.

Turning to FIG. 1, the machining apparatus 10 conventionally includes a cutting tool 20 adapted for use with a conventional milling, transfer line, or CNC machine, such as manual, 2-axis, and 3-axis vertical machining centers, and their equivalents. The tool 20 generally presents a cutting surface 22 near the distal end of the tool, when secured by a toolholder 24. The cutting surface 22 may present a milling, reaming, or drilling section configured to cut or shave the workpiece 12 or guide 14 in both the radial and longitudinal directions, and may present any suitable configuration or length. For example, the cutting surface 22 may present a ball end, ¼-rounding, 2-flute, 3-flute, 4-flute, 5-flute, or a 6-flute section, depending upon the intended application. Where the tool 20 is configured to ream a pre-existing hole, the tool 20 is selected so as to present a cross-sectional diameter larger than the hole. Finally, the toolholder 24, more particularly, includes a nose (or spindle) 26, a clamp 28 for securing the tool in a fixed position relative to the toolholder 24, and drive means (not shown) for rotating the spindle 26, clamp 28, and tool 20.

The inventive apparatus 10, however, further includes a compressible element operable to provide lateral support to the tool 20 during the machining process. The element is preferably configured to support the tool 20, and engage the workpiece 12 at the borehole tool entrance, during the portion of the machining process, wherein tool deflection would otherwise become intolerable. While supporting the tool 20 the element is configured to compress, collapse or otherwise retract, so as to enable the further translation of the tool 20 into the workpiece 12. More preferably, propulsion means are also included for autonomously returning the element to its extended condition, once the borehole is complete, and the tool 20 is removed.

In the illustrated embodiments shown in FIGS. 1 through 4, the compressible element is presented by a retractable bushing 16 that shifts between extended (see, FIG. 1) and fully retracted (see, FIG. 3) positions. The apparatus 10 also includes biasing means 18 for exhorting an outward force upon the bushing 16, so as to cause it to be biased towards the extended position. More particularly, the bushing 16 presents an integrally formed tubular sleeve 30, and a tubular base 32.

The sleeve 30 is concentrically aligned with, and presents a cross-sectional inside diameter slightly larger than the diameter of the tool 20, so as to slidably engage the tool 20 during tool translation. It is appreciated that clearance between the tool 20 and bushing 16 must be less than the anticipated tool deflections sought to be prevented at that location. More preferably, a thin layer of lubricant, and more preferably, a solid lubricant 34, is interposed between the bushing 16 and tool 20, so as to reduce friction during the retraction or extension of the bushing 16 on top of the tool. Finally, the sleeve 30 preferably presents a tapered section 36 adjacent the distal bushing end, so as to reduce the surface area of engagement with the workpiece 12.

It is appreciated by those ordinarily skilled in the art that the reduction in contact area reduces friction, and the abrasion experienced by the workpiece 12. To further reduce abrasion, and frictional heat energy loss, the preferred apparatus 10 further includes at least one workpiece-engagement pad 38 fixedly attached to the distal end of the bushing 16. In this configuration, a singular circular pad 38 may be bonded with suitable high-temperature epoxy, as shown in FIG. 4a, to the bushing 16. More preferably, a plurality of smaller pads 38 is included, wherein the pads 38 collectively present a further reduction of contact area, as shown in FIG. 4b. Finally, to increase the rate of dissipation of the frictional heat energy generated by the contact area, a plurality of press air orifices 40 are defined by the sleeve 30, and located adjacent the pads. Similarly, where a singular circular pad 38 is utilized, a conical void may be defined by the sleeve 30.

Figure 2:
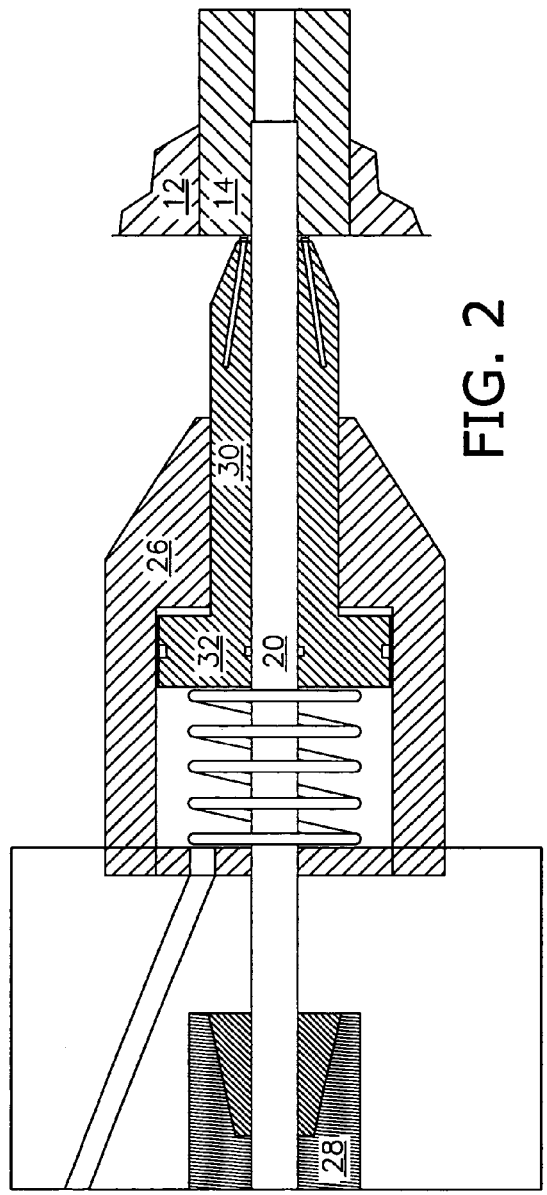
FIG. 2 is an elevation and partially cross-sectional view of the workpiece, and apparatus shown in FIG. 1, particularly showing the tool and bushing in the initial bushing engagement position.
Figure 3:
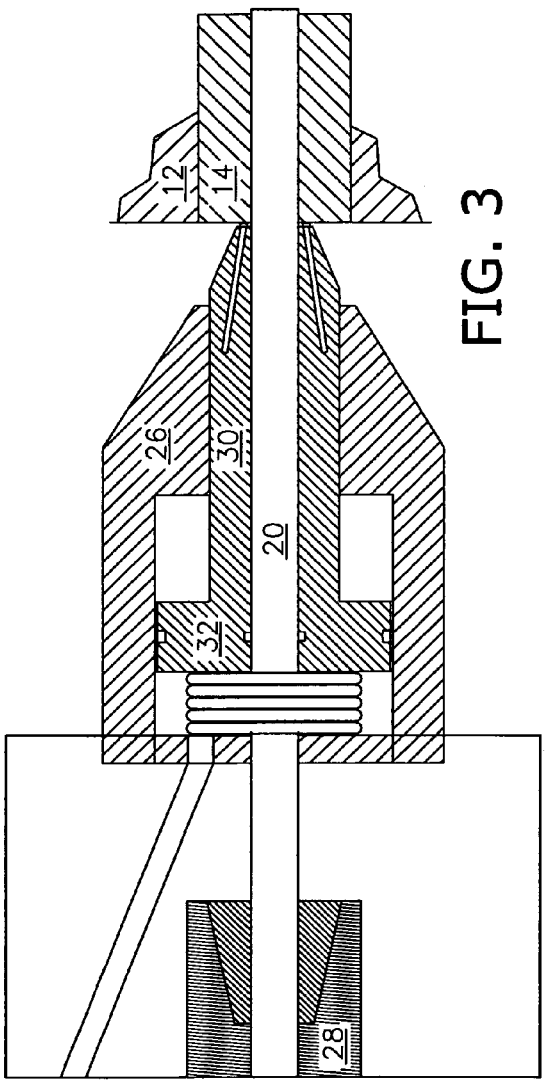
FIG. 3 is an elevation and partially cross-sectional view of the workpiece, and apparatus shown in FIG. 1, wherein the bushing is in the fully retracted position, and the tool and bushing are engaged with the workpiece.

The base 32 presents an outer cross-sectional diameter larger than the outer diameter of, and a substantially shorter longitudinal length than the sleeve 30. The spindle 26 is configured, so that the sleeve 30, and base 32 form a catch, which limits the outward translation of the bushing 16. More particularly, in the assembly, the distal end of the spindle 26 presents a stop by defining an interior diameter slightly larger than the outside diameter of the sleeve 30, but substantially less than the outer diameter of the base 32. As shown in FIGS. 1 through 3, so as to reduce friction between the spindle 26 and bushing 16, solid lubricant layers 42 are also preferably interposed therebetween; or, a cylindrical cut-out 44 may be provided instead of or in addition to superjacent lubricant layers 42. The base 32 may further define at least one cylindrical cut-out 46 along the tool engagement surface as well. The cut outs (grooves) 44 and 46 may be further used to store an O-Ring to prevent dirt entering the cavity behind.

As previously mentioned, the apparatus 10 includes biasing means 18 for exhorting an outward force upon the bushing 16, so as to return the bushing 16 to the extended position, upon retraction, and once the borehole is complete. In the illustrated embodiment shown in FIGS. 1 through 3, the biasing means is presented by a spring 48 housed within a void defined by the spindle 26 and bushing 16. A suitable spring 48 presents a spring constant of sufficient value, so as to propel the bushing outward when free, but be easily overcome by the tool translation force when the bushing 16 is engaged with the workpiece 12. The toolholder 24 defines an orifice 50 that fluidly couples the void, and ambient air conditions, so as to allow the ingress and egress of air into and from the void.

Alternatively, as shown in FIG. 5, the biasing means may be presented by introducing pressurized air within the void sans the spring 48. In this configuration, the orifice 50 is fluidly coupled to a pneumatic pump or device 52, so as to form a conduit; and an O-ring 54 is preferably positioned intermediate the bushing base 32 and spindle 26, so as to further seal the void. The fluid pressure acting upon the base 32 and within the void provides the resistive force.

Figures 6, 6A:
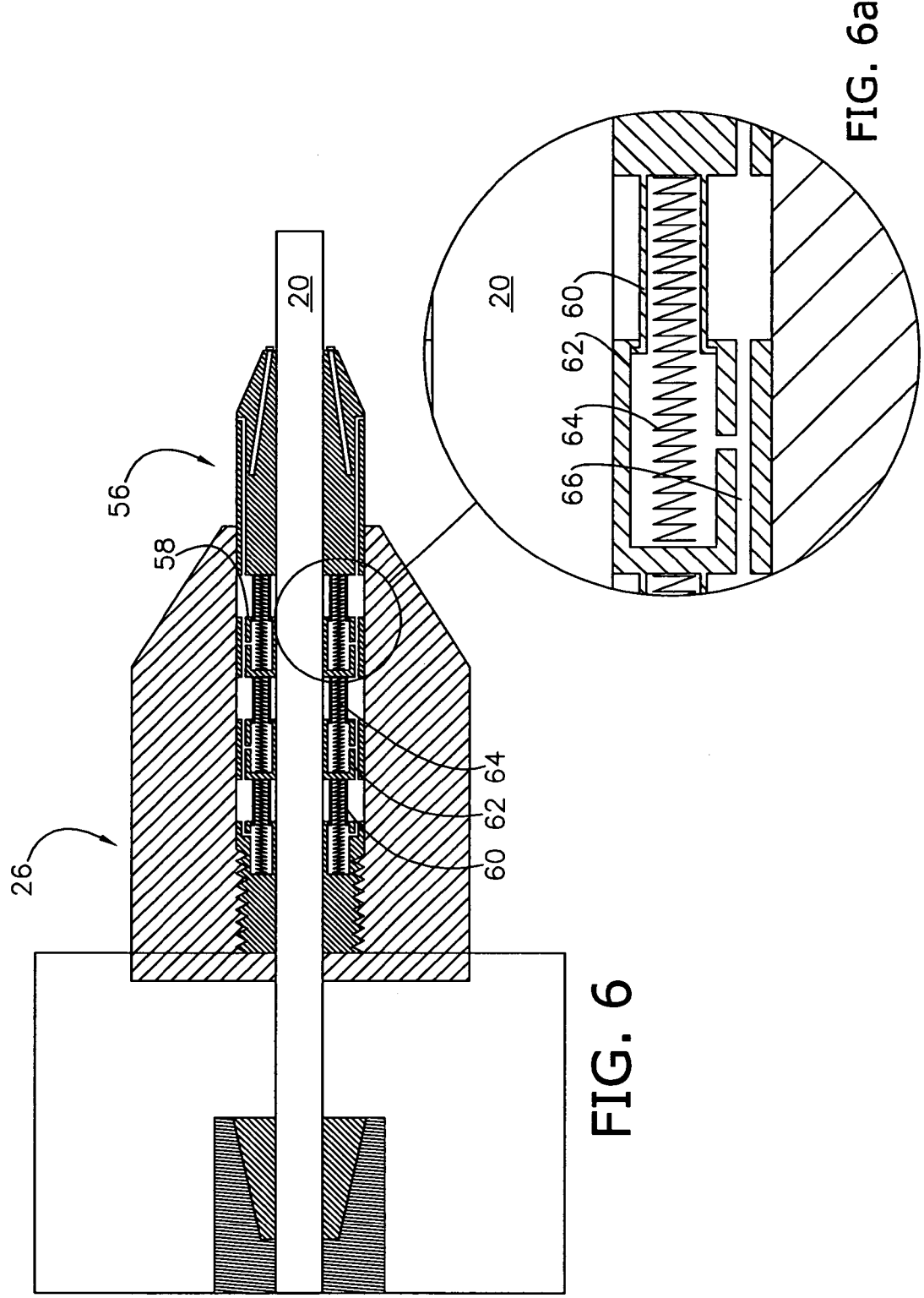
FIG. 6 is an elevation and partially cross-sectional view of the workpiece, and apparatus, in accordance with a third preferred embodiment of the present invention, wherein the compressible element presents a spring-biased collapsible multi-segment bushing.
FIG. 6a is an enlarged view of a prong and receptacle shown in FIG. 6.

Another alternative is shown in FIG. 6, wherein the compressible element is presented by a spring-biased collapsible multi-segment bushing 56. In this configuration, each segment 58 of the bushing 56 defines preferably two hallow male prongs 60 and two female receptacles 62 each configured to slidably receive a male prong 60 from an adjacent segment. In each receptacle 62 and prong 60, a spring 64 is housed and configured to constantly exhort equal and outward forces upon the adjacent segments. As shown in FIG. 6a, the prongs 60 and receptacles 62 are cooperatively configured to further present a catch, so that the outward translation of the prongs 60 is limited. Also, shown in FIG. 6a, the bushing 56 and spindle 26 are preferably configured so that the lateral deflection of each segment 58 is prevented or limited by the spindle 26, even in the extended position. Finally, air orifices 66 are also defined by each segment 58 to facilitate compression. It is appreciated that in this configuration, the spindle 26 and bushing 56 need not define a void, main air orifice 50, or a catch, but instead are fixedly, or more preferably removeably coupled to each other. For example, the bushing 56 and spindle 26 may be threadably coupled, as shown in FIG. 6.

Thus, as shown in FIGS. 1 and 2, to perform the single-pass finished bore process of the present invention, the tool 20 and workpiece 12, including guide 14, are initially positioned and oriented, so as to achieve a pre-engaged condition wherein the tool 20 and the pre-bore hole defined by the guide are concentrically aligned (see, FIG. 1). Upon manual or robotic actuation by a user, the rotating tool 20 is linearly translated along the longitudinal co-axis, until engaging guide 14 to shave or shear material therefrom. As shown in FIGS. 1 and 2, once the tool 20 is inserted into the guide 14, a distance, D, not greater than two times the tool diameter, the bushing 16 and workpiece 12 become engaged. As the tool continuously translates and reams through the full depth of the guide 16 to produce the finished borehole, the spring 48 is compressed and the bushing retracts towards the fully retracted position (see FIG. 3). Once complete, the tool 20 is withdrawn, and the bushing 16 is disengaged from the workpiece 12, allowing the biasing means 18 to push the bushing 16 back to the extended position. More preferably, the tool 20 additionally reams the borehole in a reverse process during withdrawal, so as to further refine the finished bore. The bore hole presents the design diameter within tolerances.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventor hereby state his intent to rely on the Doctrine of Equivalents to determine and assess the reasonably fair scope of the present invention as pertains to any system or method not materially departing from but outside the literal scope of the invention as set forth in the following claims.

What is claimed is:

1. An apparatus for machining a finished borehole in a workpiece, in a single pass, said apparatus comprising:
   a tool configured to mill or ream the workpiece when in contact therewith and while rotating and translating relative thereto, so as to produce the finished borehole in the workpiece;
   a tool holder configured to rotate the tool and secure the tool in a fixed position relative to the tool holder, so as to present a distal tool end; and
   a first bushing retractably coupled to the tool holder, and presenting a support section laterally adjacent at least a portion of, so as to limit deflection by, the tool, during machining,
   said tool and bushing being cooperatively configured so that the bushing contacts the workpiece after the tool, and slidably engages the tool during at least a portion of the tool translation period.

2. The apparatus as claimed in claim 1, said tool defining a longitudinal axis, said bushing defining an interior opening concentrically aligned with the axis, so that the tool translates within the opening.

3. The apparatus as claimed in claim 2, said support section completely circumscribing the tool, so as to form a superjacent sleeve therewith.

4. The apparatus as claimed in claim 1, said bushing being retractable from an extended position and towards a fully retracted position, and biased towards the extended position.

5. The apparatus as claimed in claim 4, said bushing, and toolholder cooperatively defining a void having a volume that fluctuates as the bushing translates between the extended and fully retracted positions, said toolholder defining an escape orifice fluidly coupled to the void and ambient air conditions, so as to allow air to flow in and out of the void.

6. The apparatus as claimed in claim 5; and a spring positioned and configured to maintain a constant outward force upon the bushing, so as to bias the bushing towards the extended position, said spring being housed within the void.

7. The apparatus as claimed in claim 4, said bushing being pneumatically biased towards the extended position.

8. The apparatus as claimed in claim 4, said toolholder and bushing being cooperatively configured so as to form a catch that limits the outward translation of the bushing.

9. The apparatus as claimed in claim 1, said bushing presenting a distal bushing end, said bushing and tool being cooperatively configured so that the distal tool end and distal bushing end in the extended position are longitudinally spaced a maximum distance equal to two times the operating diameter of the tool, wherein the tool holder is closer to the bushing end.

10. The apparatus as claimed in claim 1, said bushing presenting a distal bushing end, and including a workpiece engaging pad at the distal bushing end, wherein said pad is configured to reduce frictional heat, and workpiece abrasion, when in contact with the workpiece.

11. The apparatus as claimed in claim 10, said bushing including a plurality of workpiece engaging pads at the distal bushing end, wherein each of said pads comprises carbide.

12. The apparatus as claimed in claim 10, said pad being adjacent a press air orifice defined by the bushing and fluidly coupled to ambient air conditions, so as to facilitate heat transfer.

13. The apparatus as claimed in claim 1, said bushing comprising a plurality of shiftably coupled segments, and a plurality of springs, wherein each segment presents a hallow male prong, and defines a female receptacle configured to receive a prong from an adjacent segment, and one of said springs is housed within each receptacle, and compressible by the received prong.

14. The apparatus as claimed in claim 1, said bushing being threadably coupled to the toolholder, so as to facilitate disassembly.

15. The apparatus as claimed in claim 14; and a plurality of threaded replacement bushings adapted for use with the toolholder, wherein each of said replacement bushings is interchangeable with the first bushing, defines an opening through which the tool translates, and presents a different opening diameter or longitudinal length, so as to be compatible with a different tool or workpiece configuration.

16. An apparatus for machining a finished borehole in a workpiece, in a single pass, said apparatus comprising:
   a tool configured to mill or ream the workpiece, when in contact therewith and while rotating and translating relative thereto, so as to produce the finished borehole in the workpiece;
   a tool holder configured to rotate the tool and secure the tool in a fixed position relative to the tool holder, so as to present a distal tool end; and
   a first bushing retractably coupled to the tool holder, and presenting a distal bushing end, and a support section laterally adjacent at least a portion of the tool, during machining,
   said tool and bushing being cooperatively configured so that the bushing contacts the workpiece after the tool, slidably engages the tool during at least a portion of the tool translation,
   said support section completely circumscribing the tool, so as to form a superjacent sleeve therewith,
   said bushing being retractable from an extended position and towards a fully retracted position, and biased towards the extended position,
   said bushing and tool being cooperatively configured so that the distal tool end and distal bushing end in the extended position are longitudinally spaced a maximum distance equal to two times the operating diameter of the tool, wherein the tool holder is closer to the bushing end.

17. A method of machining a finished borehole in a workpiece in a single pass, said method comprising the steps of:
   (a) rotating and translating a tool relative to the workpiece, wherein said tool defines a distal end, presents a cutting surface adjacent the distal end, and engages the workpiece with the cutting surface, so as to shave material from the workpiece;
   (b) laterally supporting the tool near the workpiece with a collapsible element, while the tool engages the workpiece; and
   (c) concurrently collapsing the element after the tool engages the workpiece, and further supporting the tool at or near the workpiece, so as to limit deflection by the tool during translation.

18. The method as claimed in claim 17, wherein the element includes a retractable bushing shiftably coupled to a tool holder, and configured to form a superjacent sleeve with the tool at or near the workpiece, during translation.

19. The method as claimed in claim 17, wherein said bushing is shiftable between extended and fully retracted positions, and biased towards the extended position.

* * * * *